(12) United States Patent
Weksler et al.

(10) Patent No.: US 11,395,144 B2
(45) Date of Patent: Jul. 19, 2022

(54) PROVIDING ROUTER PASSWORD TO DEVICES

(71) Applicant: Lenovo (Singapore) Pte. Ltd., Singapore (SG)

(72) Inventors: Arnold S. Weksler, Raleigh, NC (US); John Carl Mese, Cary, NC (US); Nathan J. Peterson, Oxford, NC (US); Mark Patrick Delaney, Raleigh, NC (US); Russell Speight VanBlon, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 13 days.

(21) Appl. No.: 16/993,653

(22) Filed: Aug. 14, 2020

(65) Prior Publication Data

US 2022/0053331 A1    Feb. 17, 2022

(51) Int. Cl.
*H04W 12/06*    (2021.01)
*H04L 9/40*    (2022.01)

(52) U.S. Cl.
CPC ......... *H04W 12/068* (2021.01); *H04L 63/083* (2013.01)

(58) Field of Classification Search
CPC ..... H04W 12/06; H04W 12/08; H04W 76/10; H04W 12/50; H04W 84/12; H04W 12/068; H04L 63/083
See application file for complete search history.

(56) References Cited

U.S. PATENT DOCUMENTS

2016/0295412 A1* 10/2016 Peterson ................. H04W 4/02
2017/0353454 A1* 12/2017 Cooper .................... H04L 63/08

FOREIGN PATENT DOCUMENTS

CA    2762465 A1 *  8/2012   ............ H04W 12/08

* cited by examiner

*Primary Examiner* — Alexander Lagor
(74) *Attorney, Agent, or Firm* — Ference & Associates LLC

(57) ABSTRACT

One embodiment provides a method, including: receiving, at a device, an indication of a change of a password of the device to a new password; identifying one or more devices wirelessly connected to the device, wherein the one or more device have connected to the device using a device password previous to the new password; and providing the new password to at least a subset of the one or more devices. Other aspects are described and claimed.

18 Claims, 3 Drawing Sheets

PROVIDING ROUTER PASSWORD TO DEVICES

BACKGROUND

One technique used to access a network is through the use of a router that provides a gateway to the network. The device connects to the router, either via a wired connection or a wireless connection, thereby giving the device access to the Internet through the router. A wireless connection is very common, particularly due to convenience and the relative ease it is to use. Wirelessly connecting to a router permits a user the freedom to move around freely within range of the router and still be connected to the network, which is a big benefit over wired connections particularly in view of the number of portable information handling devices (e.g., smart phone, laptop computer, tablet, wearable smart devices, etc.) and network-capable devices (e.g., network-capable appliances, digital or personal assistant devices, network-capable lights, network-capable home monitoring devices, etc.) that users have and use. However, the process of wirelessly connecting a device to the router includes more steps than when using a hardwire connection. Thus, the wireless connections process can face issues that a hardwire connection will not face.

BRIEF SUMMARY

In summary, one aspect provides a method, comprising: receiving, at a device, an indication of a change of a password of the device to a new password; identifying one or more devices wirelessly connected to the device, wherein the one or more device have connected to the device using a device password previous to the new password; and providing the new password to at least a subset of the one or more devices.

Another aspect provides an information handling device, comprising: a processor; a memory device that stores instructions executable by the processor to: receive, at the information handling device comprising a device, an indication of a change of password of the device to a new password; identify one or more devices wirelessly connected to the device wherein the one or more devices have connected to the device using a device password previous to the new password; and provide the new password to devices of the one or more devices and identified within the user authorizations.

A further aspect provides a product, comprising: a storage device that stores code, the code being executable by a processor and comprising: code that receives, at a device, an indication of a change of a password of the device to a new password; code that identifies one or more devices wirelessly connected to the device, wherein the one or more device have connected to the device using a device password previous to the new password; and code that provides, the new password to devices of the one or more devices and identified within the user authorizations.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
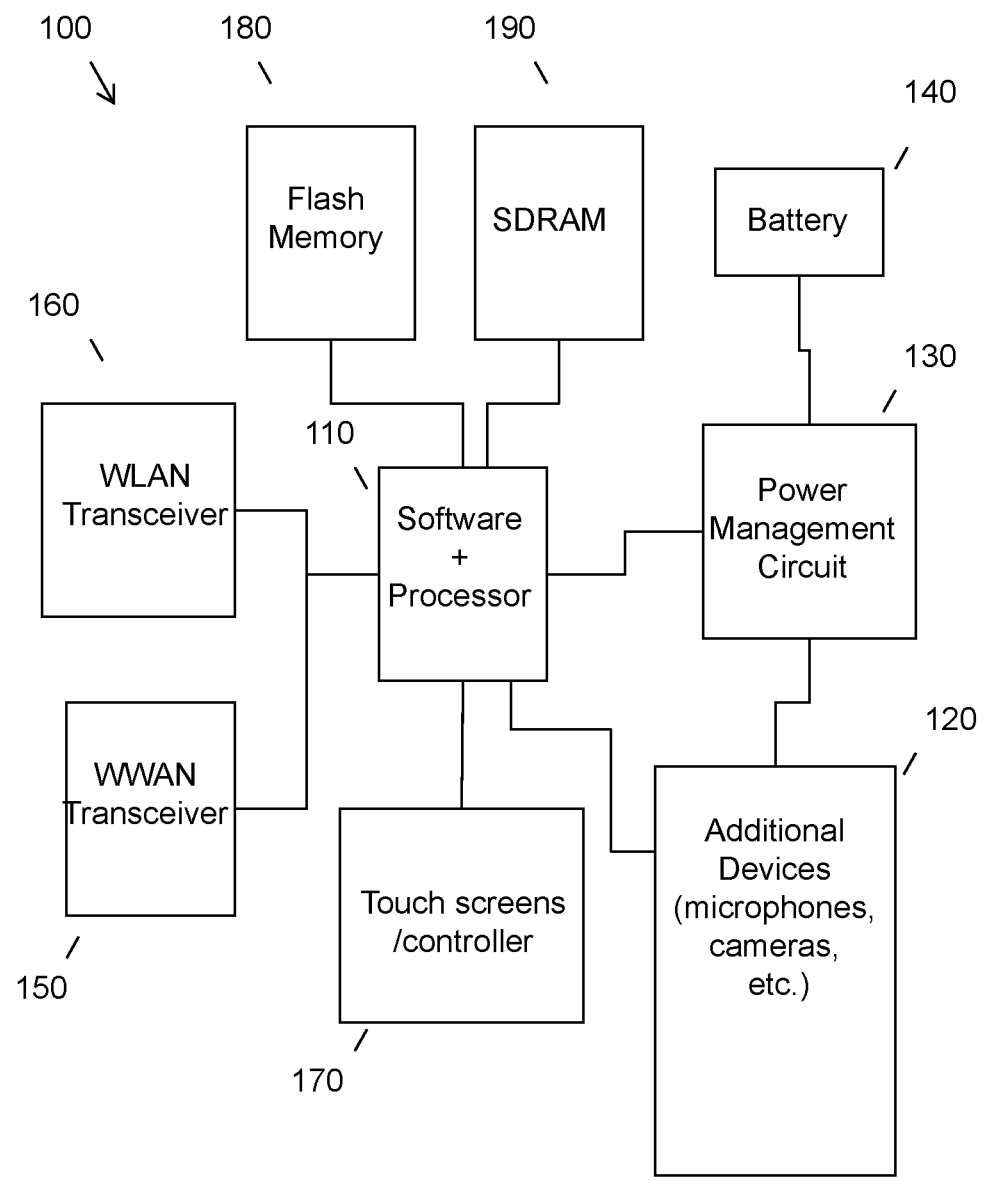
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As the use of wireless communication becomes more prevalent in society, more devices have started to include the ability to wirelessly communication with other devices. As users start integrating more of these devices within homes and businesses, users want to allow these devices to communicate with each other. Additionally, the user prefers to have a single device that acts as a gateway to the global network or Internet instead of individually connecting each device to the global network. In some networks, devices can connect to the network, usually via a gateway device like a router, without the use of a password. This makes it very easy for users to connect to the network. However, this is also a very insecure network. For example, the information present on the device connected to the network can be easily obtained by hackers because there is no security keeping devices off of the network and other users can see information about those devices that are connected to the network in an unsecure manner. These types of networks are commonly large wireless networks that are provided in common places (e.g., airports, amusement parks, sport venues, coffee shops, etc.). This unsecure form of network connection is provided in these environments because sharing a password with everyone who wants to access the network is a large inconvenience. Additionally, if every person has the password to a network, then the network is no longer secure any way.

However, the use of a password to access a network provides at least an initial line of defense from those trying to obtain personal information. Additionally, secured networks prevent unauthorized people from accessing the network and hogging bandwidth capacity, using data allowances, and otherwise slowing down or misusing the network. Thus, in order to prevent other, unauthorized devices from connecting to devices of the user or the single device, the devices are password protected. According, in order to connect to the device with other devices a user must provide the password to the other devices. The example device that will be used here throughout is a router. However, the described process can be applied to any password protected device, particularly those devices that are connected to by other devices. Since the password of each router is different, the ability to access the network by an unauthorized person is more difficult. However, keeping a password the same for a long length of time increases the chance that someone could access the network. Additionally, if someone previously accessed a network and the password is never changed, that person can subsequently access the network. Thus, it is good practice to change the password for the gateway device frequently.

Conventionally, when a password is changed on a device that connects to other devices, the other devices can no longer communicate with the device until the other devices are notified of the access password change. This requires a user to access each of the devices and provide the new password to each of the devices. Additionally, the methods for providing passwords to devices are different between the devices. For example, a house that utilizes a router to permit access to a private network may have multiple smartphones, digital personal assistants, appliances (e.g., microwave, refrigerator), televisions, gaming systems, and the like, connected to the private network through the router. Inputting a router password into a smartphone is a different process than inputting the router password into the gaming systems. For some devices, inputting new passwords is fairly straightforward even if multiple steps have to be taken. However, for other devices, inputting passwords is very tedious and time-consuming, particularly for those devices that do not have a keyboard or other type of keypad input device. Additionally, the simple fact of having to input a password into devices is inconvenient and time consuming.

Accordingly, the described system and method provides a technique for securely updating passwords across devices that wirelessly communicate with or are connected to another device. For example, the devices may all be included in an Internet of Things (IoT) setting and may, therefore, all communicate with each other within a network. A system may identify a change in a router password, and then push the updated password to authorized devices without the need for a user to manually input a new password into a device. To determine the authorized devices, in an embodiment a user may be presented with a listing of devices that are either currently connected to or have previously been connected to the device whose password has been updated, referred to as a gateway device or router for ease of readability. The user can then select which devices should be provided with the new password. Additionally, or alternatively, if a device that is not currently connected to but previously had been connected to the gateway device and can provide a previously valid password, the system may allow the device to connect to the gateway device after validating the old password and then provide the new password to the device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, etc. System 100 often includes one or more touch screens 170 for data input and display/rendering. System 100 also typically includes various memory devices, for example flash memory 180 and SDRAM 190.

Figure 2:
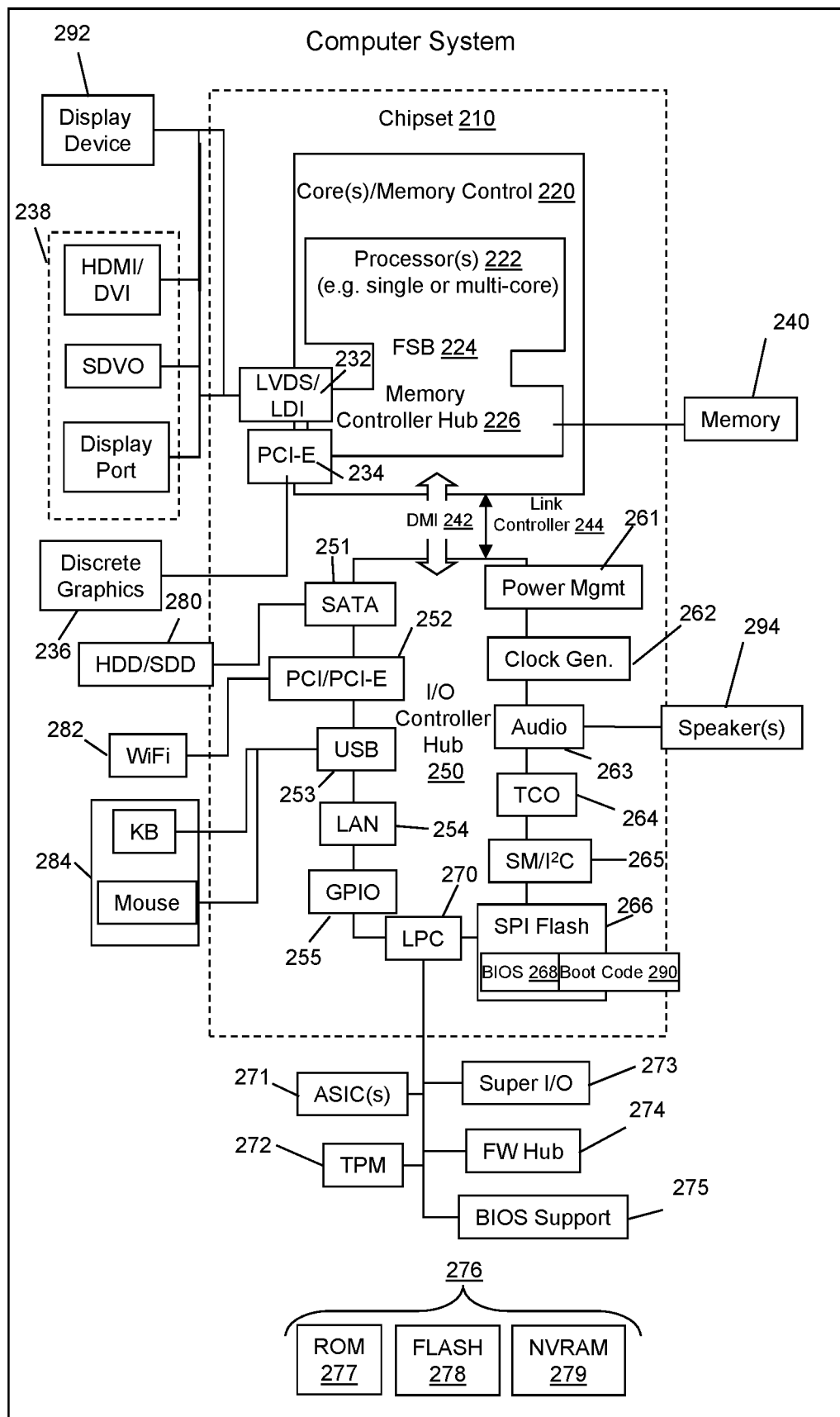
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices capable of connecting to and communicating with other devices wirelessly. For example, the circuitry outlined in FIG. 1 may be implemented in a smart phone or tablet embodiment, whereas the circuitry outlined in FIG. 2 may be implemented in a laptop device.

Figure 3:
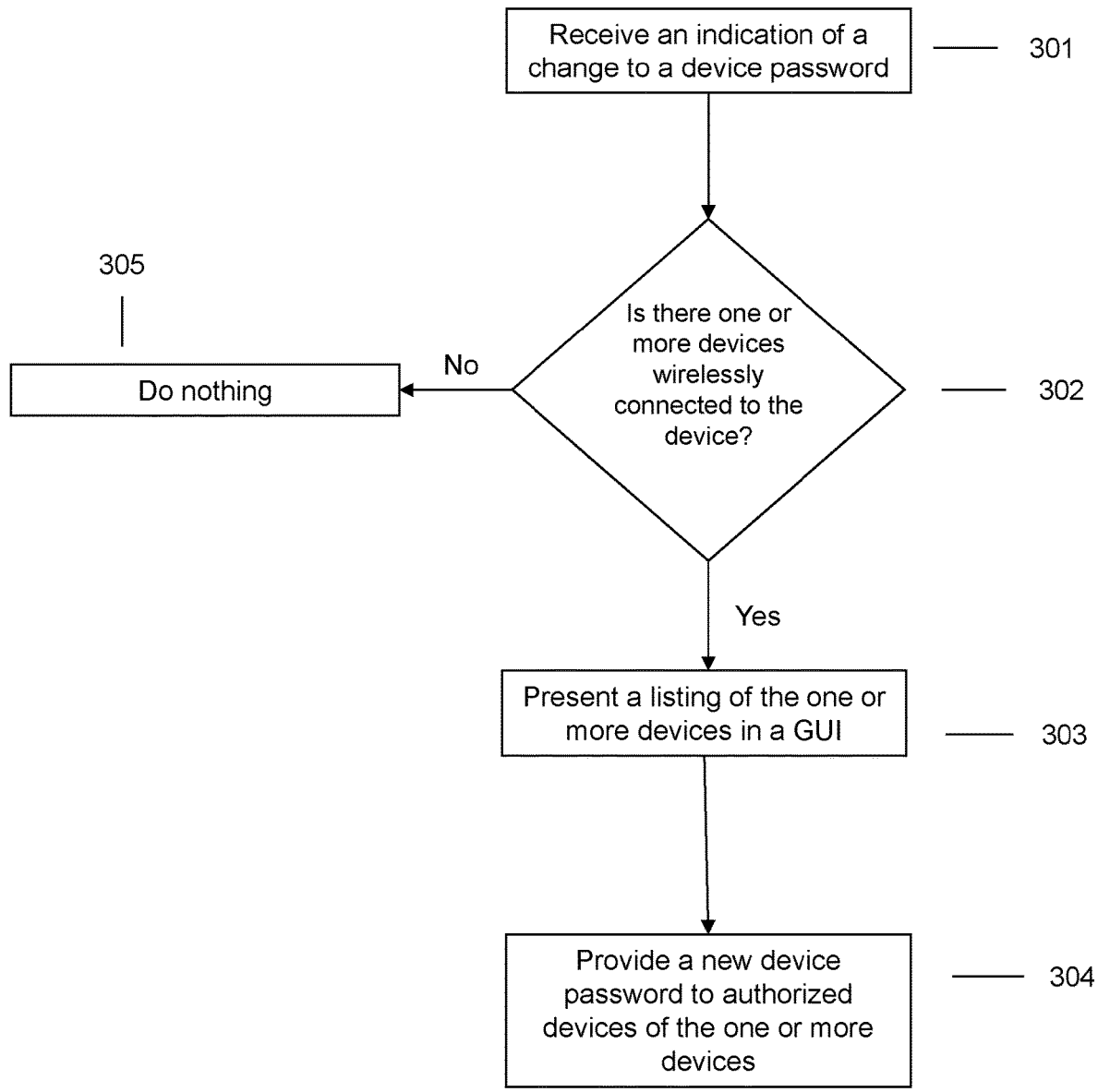
FIG. 3 illustrates an example method of updating a router password for one or more authorized devices.

Referring now to FIG. 3, a method for securely updating passwords across devices that wirelessly communicate with or are connected to another device is provided. For ease of readability, the example of a gateway device or router will be used here throughout as the device whose password is being changed. However, it should be understood that the described method can be applied to any device that communicates with or is connected to another device, particularly wirelessly. For example, in an Internet of Things (IoT) setting, devices that are a part of the IoT are able to communicate with each other. An Internet of Things may be broadly defined as a system of interconnected devices. Generally, the communication between the devices of the IoT occurs through a gateway device. However, it could also occur directly between devices. For example, a smart thermostat may be able to communicate directly with smart blinds. Each of these devices may have a password. Thus, if the password on these devices is changed, the described system and method could be implemented to facilitate quick password updates.

At 301, an indication may be received at the router, gateway device, or other device, that a change to a password of the device has occurred. As stated above, the term router will be used here throughout as the example simply for ease of readability and is not intended to limit this disclosure in any way. In an embodiment, a change in the router password could be a manual change performed by a user. For example, the user may access the router settings and provide a new password to the router. In an embodiment, a change in the router password may be an automatic change performed periodically. For example, the router may be programmed to change the password to a new random password at predetermined intervals (e.g., every month, every week, etc.) or upon the detection of a trigger event (e.g., a user providing an indication to change the password, detection of a network attack, detection of a device change, etc.).

The router password may be utilized by other devices to connect to the router. The router may then provide the devices access to a network, the Internet, other devices on the network, and/or the like. In other words, the router is a gateway for other devices to connect to some broader network. Thus, for ease of understanding, the router password as referenced herein will be understood as being a WiFi password associated with a router; however, this is a non-limiting example. Additionally, throughout the description of this system, when referencing the network accessed through a router, the network is a wireless network. This is also a non-limiting example. For example, passwords can also be utilized for hardwired connections.

Another device is connected to the router by providing the router password to the device. A router password is unique to each router, and as mentioned previously, may be adjusted and changed. However, each device that connects to the router utilizes the same router password. Thus, when the router password is changed at the router, the router password stored in all of the devices must also be changed or the device will no longer be able to access and connect to the router. Accordingly, at 302, a system may determine if there are one or more devices that are wirelessly connected to the router.

In an embodiment, the use of wireless communication permits the connecting and disconnecting of a device to other devices within a specific area. For example, a user may utilize a smart phone having wireless capabilities. When the smart phone enters an environment containing a device that the smart phone has been previously connected to, the smart phone may reconnect to that device while present in that environment. Further, when the user leaves the environment, the smart phone will disconnect from the network. Accordingly, the system may not only identify at 302, those devices that are currently connected to the router, but may also identify the devices that have previously been connected to the router at least once, even if they may not currently be connected to the router. In identifying the devices, either those currently connected or those previously connected, the system may identify a device identifier that is or was connected to the router. This device identifier can then be correlated with a device and any other device information that is shared with the router (e.g., user profiles, biometric information, connection type, device capabilities, etc.). The password used by a device and stored within the device to access a router may be the password for the router used at the time the device connected to the router. Any previous router passwords used by the device or associated with the router (i.e., any previous valid router passwords) may be saved by both the device accessing the router and also by the router.

If, at 302, the system determines that no devices are either currently connected to the router or have previously been connected to the router, the system may do nothing 305. Additionally, the system may do nothing at 305 if the system determines that there are no current devices connected to the router. In the instance that there were any devices previously connected to the router, the system may only take action upon that device attempting to reconnect to the router after the password change.

If, on the other hand, the system determines that there are devices currently connected to the router or that were previously connected to the router, the system may provide the new router password to the authorized devices at 304. This step is discussed in more detail below. To determine which devices should be provided the new router password the system may present a graphical user interface (GUI) containing a listing of the one or more devices connected to a network though a router at 303. Presentation of a graphical user interface is not strictly required, as the system may simply update devices with the new router password automatically with no user indication, selection, or other input. In this manner, updating the passwords may be for either or both the currently connected devices and the previously connected devices.

The listing or graphical user interface may also be presented if the system is designed to do nothing with respect to previously connected devices until that device attempts to reconnect to the router. The GUI may provide an interface for a user to provide selections and input to the system. In other words, the GUI may be editable by a user and present a user with one or more functional inputs to alter router information and router-device relationships. In an embodiment, the listing of the devices may include a connection status identifying a current connection state of a device, for example, currently connected, previously connected, manually deleted or removed from router connection, terminated connection, or the like. Other information may also be included in the GUI, for example, a device identifier, date of last access to the router, connection type (e.g., wireless, wired, 4G, secured, unsecured, etc.), user information, and the like.

A currently connected connection status means that the device currently has an active connection with the router. A currently connected connection status may also be associated with a device if that device has been connected to the router within a threshold length of time, for example, within the last hour, within the last day, within the last week, or the like. A device that frequently connects to the router may also be associated with a currently connected connection status, for example, if the device connects to the router every day, at least once a week, or the like. A previously connected connection state means that the device was previously connected to the router using a router password that was valid at the time of connection to the router. Thus, this device is recognized by the router but does not have a current password for the router. A device may also get a previously connected status if the device has not connected to the router within a threshold length of time. Thus, while the device may have a current router password, the device will have to be re-authorized by the router due to the lapse of the predetermined length of time.

Within the GUI, the user may select the devices from the listing of devices that should be automatically updated with the new router password. In other words, the user can select authorized devices. The user can select all of the devices in the listing or simply some of the devices in the listing. In other words, a subset of the devices that are selected as authorized devices may be all or some of the devices in the listing. Instead of having to select devices individually, the user may be able to select groups of devices within the GUI. For example, the devices may be sorted or grouped within the GUI, for example, by connection status, last access date, user associated with the device, or the like. The user could then just select a group selection box that would select all devices within the group. Other layouts and selection options are contemplated and possible. A device may also be historically authorized, meaning the user does not have to select the device from the GUI listing every time the router password is changed. Rather, the user can authorize the device a single time and then indicate that the device should remain authorized upon subsequent router password changes until the user denotes otherwise.

Once the user provides an indication of the authorized devices, or, if the system is set up to automatically update the passwords of connected devices, the system may provide the new router password to the devices at 304. These devices will be referred to as authorized devices for ease of readability. However, the term "authorized devices" can refer to either those devices specifically authorized by the user, for example, through selection in a GUI, or those devices that the system is set up to automatically provide the new router password to with no user input. These authorized devices will be automatically provided with the new router password without the user having to manually input the new router password into the authorized device. In other words, the system will automatically push the new router password to the authorized devices. For devices having an active connection to the router, the system may provide the router password as soon as the device is identified as authorized. Other information may also be utilized to assist in validating the authorized device, for example, device identifiers, user profiles, MAC address, saved IP address, Network name, or the like. For example, the system may utilize the device identifier and compare it to device identifiers of authorized devices to verify the device is an authorized device.

For authorized devices that are not currently connected to the device, the password may be pushed to the authorized device when the device attempts to connect to the router. In this case, as an extra layer of security, possibly in addition to the other information used to validate the device, the device may have to present a previously valid router password. For example, since the device was previously connected to the router, the device has a previous router password that was valid for connecting to the router. Upon attempting to connect to the router after the password change, the device may have to provide the previously valid router password to the router. Upon validating that the provided router password was a previously valid password, the router will push the new router password to the authorized device, thereby allowing the authorized device to connect to the router without the user having to manually provide the new router password to the device.

The various embodiments described herein thus represent a technical improvement for updating passwords across a plurality of devices. Rather than manually inputting a new password into each device that is connected to the router, the user may identify authorized devices at the router. These devices may then be automatically provided the new password upon connection to the router. Providing the new router password from the router to the authorized devices decreases the amount of time that a user must spend in updating device passwords and also ensures that all authenticated devices are updated so the user does not have to remember and identify every device that needs a manual update of the password. Additionally, disruptions in the connections to the network are minimized. Thus, the described system is less tedious, less time-consuming, and causes fewer disruptions than the conventional methods of having to update the passwords at the device itself. In other words, the user only has to change the password at the router and not at every connected device.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at a device, an indication of a change of a password of the device to a new password, wherein the device stores a plurality of versions of the device password previously used for obtaining connection to a network;
   identifying one or more devices wirelessly connected to the device, wherein the one or more devices have connected to the device using a device password previous to the new password, wherein the identifying the one or more devices comprises utilizing a device identifier and a connection status of the one or more devices, wherein the connection status is selected from a group consisting of: currently connected and previously connected; and
   providing the new password to at least a subset of the one or more devices, wherein the providing the new device password comprises automatically updating a stored device password for each of the one or more devices upon connection to the device.

2. The method of claim 1, further comprising a graphical user interface comprising a listing of the one or more devices;
   wherein the providing is based upon user authentications provided in the graphical user interface.

3. The method of claim 2, wherein the graphical interface comprises a list of each device that has connected to the device over time.

4. The method of claim 1, wherein the device stores a version of the device password used by each of the one or more devices to connect to the device.

5. The method of claim 1, wherein at least a subset of the one or more devices comprise devices that historically connected to the device but are not currently connected to the device.

6. The method of claim 5, comprising, responsive to one of the devices of the at least a subset attempting to connect to the device subsequent to implementation of the new password, receiving, at the device, a previous device password used by the one of the devices;
   authenticating, at the device, the one of the devices; and
   providing, from the device, the new password to the one of the devices.

7. The method of claim 6, wherein the authenticating and the providing is responsive to receiving authorization from the user for the device identifier corresponding to the one of the devices to be updated with the new password.

8. The method of claim 1, wherein the providing comprises automatically providing the new password to all devices currently connected to the device.

9. The method of claim 1, wherein providing is responsive to receiving user authorizations providing an indicator of device identifiers for the devices of the one or more devices that the device is authorized to update with the new password.

10. An information handling device, comprising:
a processor;
a memory device that stores instructions executable by the processor to:
receive, at the information handling device comprising a device, an indication of a change of password of the device to a new password, wherein the device stores a plurality of versions of the device password previously used for obtaining connection to a network;
identify one or more devices wirelessly connected to the device wherein the one or more devices have connected to the device using a device password previous to the new password, wherein to identify the one or more devices comprises utilizing a device identifier and a connection status of the one or more devices, wherein the connection status is selected from a group consisting of: currently connected and previously connected; and
provide the new password to devices of the one or more devices and identified within the user authorizations wherein to provide the new device password comprises automatically updating a stored device password for each of the one or more devices upon connection to the device.

11. The information handling device of claim 10, wherein the instructions executable by the processor comprise instructions to present a graphical user interface comprising a listing of the one or more devices;
wherein to provide is based upon user authentications provided in the graphical user interface.

12. The information handling device of claim 11, wherein the graphical user interface comprises a list of each device that has connected to the device over time.

13. The information handling device of claim 10, wherein the device stores a version of the device password used by each of the one or more devices to connect to the device.

14. The information handling device of claim 10, wherein at least a subset of the one or more devices comprise devices that historically connected to the device but are not currently connected to the device.

15. The information handling device of claim 14, wherein the instructions executable by the processor comprise instructions to, responsive to one the devices of the at least a subset attempting to connect to the device subsequent to implementation of the new password, receive, at the device, a previous device password used by the one of the devices;
authenticate, at the device, the one of the devices; and
provide, from the device, the new password to the one of the devices.

16. The information handling device of claim 15, wherein to authenticate and to provide is responsive to receiving authorization from the user for the device identifier corresponding to the one of the devices to be updated with the new password.

17. The information handling device of claim 10, wherein to provide comprises to automatically provide the new password to all the devices currently connected to the device.

18. A product, comprising:
a storage device that stores code, the code being executable by a processor and comprising:
code that receives, at a device, an indication of a change of a password of the device to a new password, wherein the device stores a plurality of versions of the device password previously used for obtaining connection to a network;
code that identifies one or more devices wirelessly connected to the device, wherein the one or more devices have connected to the device using a device password previous to the new password, wherein the code that identifies the one or more devices comprises utilizing a device identifier and a connection status of the one or more devices, wherein the connection status is selected from a group consisting of: currently connected and previously connected; and
code that provides, the new password to devices of the one or more devices and identified within the user authorizations wherein the code that provides the new device password comprises automatically updating a stored device password for each of the one or more devices upon connection to the device.

\* \* \* \* \*